US008688608B2

(12) United States Patent
Atasu et al.

(10) Patent No.: US 8,688,608 B2
(45) Date of Patent: Apr. 1, 2014

(54) VERIFYING CORRECTNESS OF REGULAR EXPRESSION TRANSFORMATIONS THAT USE A POST-PROCESSOR

(75) Inventors: Kubilay Atasu, Rueschlikon (CH); Jason R. Baumgartner, Austin, TX (US); Christoph Hagleitner, Rueschlikon (CH); Mitra Purandare, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/170,739

(22) Filed: Jun. 28, 2011

(65) Prior Publication Data

US 2013/0007530 A1 Jan. 3, 2013

(51) Int. Cl.
*G06F 11/28* (2006.01)

(52) U.S. Cl.
USPC .............................................. 706/45; 714/40

(58) Field of Classification Search
None
See application file for complete search history.

(56) References Cited

U.S. PATENT DOCUMENTS

| | | | |
|---|---|---|---|
| 5,835,892 A | 11/1998 | Kanno | |
| 6,108,676 A | 8/2000 | Nakatsuyama | |
| 7,119,577 B2 * | 10/2006 | Sharangpani | 326/46 |
| 7,240,040 B2 * | 7/2007 | Wyschogrod et al. | 706/48 |
| 7,411,418 B2 * | 8/2008 | Gould et al. | 326/46 |
| 7,512,634 B2 * | 3/2009 | McMillen | 1/1 |
| 7,689,530 B1 * | 3/2010 | Williams et al. | 706/62 |
| 7,788,206 B2 * | 8/2010 | McMillen et al. | 706/48 |
| 2006/0253816 A1 * | 11/2006 | Gould et al. | 716/5 |
| 2007/0220461 A1 * | 9/2007 | Baumgartner et al. | 716/5 |
| 2007/0226362 A1 * | 9/2007 | Johnson et al. | 709/230 |
| 2008/0037539 A1 * | 2/2008 | Paramaguru | 370/392 |
| 2008/0071802 A1 * | 3/2008 | Lucco et al. | 707/100 |
| 2008/0077587 A1 | 3/2008 | Wyschogrod et al. | |
| 2008/0140631 A1 * | 6/2008 | Pandya | 707/3 |
| 2008/0140911 A1 * | 6/2008 | Pandya | 711/101 |
| 2008/0270342 A1 * | 10/2008 | Ruehle | 707/1 |
| 2009/0106183 A1 * | 4/2009 | Estan et al. | 706/48 |
| 2009/0138837 A1 * | 5/2009 | Baumgartner et al. | 716/6 |
| 2010/0114811 A1 * | 5/2010 | Lambov | 706/48 |
| 2010/0199241 A1 * | 8/2010 | Baumgartner et al. | 716/5 |
| 2010/0218148 A1 * | 8/2010 | Baumgartner et al. | 716/5 |
| 2011/0022617 A1 * | 1/2011 | Yamagaki | 707/758 |
| 2011/0307433 A1 * | 12/2011 | Dlugosch | 706/45 |
| 2012/0203761 A1 * | 8/2012 | Biran et al. | 707/713 |

OTHER PUBLICATIONS

Baumgartner J. et al., "Scalable Conditional Equivalence Checking: An Automated Invariant-Generation Based Approach", FMCAD, IEEE, 2009, pp. 120-127.*

(Continued)

*Primary Examiner* — Jeffrey A Gaffin
*Assistant Examiner* — Dave Misir
(74) *Attorney, Agent, or Firm* — Cantor Colburn LLP; Daniel Morris (57) ABSTRACT

A method for determining correctness of a transformation between a first finite state automaton (FSA) and a second FSA, wherein the first FSA comprises a representation of a regular expression, and the second FSA comprises a transformation of the first FSA includes determining a third FSA, the third FSA comprising a cross product of the second FSA and a post-processor; determining whether the first FSA and the third FSA are equivalent; and in the event that the first FSA is determined not to be equivalent to the third FSA, determining that the transformation between the first FSA and the second FSA is not correct.

17 Claims, 9 Drawing Sheets

(56) References Cited

OTHER PUBLICATIONS

Lunteren J. et al., "Regular Expression Acceleration at Multiple Tens of Gb/s", Workshop on accelerators for high performance architectures, International Conference on Supercomputing, 2009.*

Smith R. et al., "Deflating the Big Bang: Fast and Scalable Deep Packet Inspection with Extended Finite Automata", SIGCOMM'08, Aug. 17-22, 2008, Seattle, Washington, USA, pp. 207-218.*

Purandare M. et al., "Proving Correctness of Regular Expression Accelerators", DAC 2012, Jun. 3-7, 2012, San Francisco, California, USA, pp. 350-355.*

Rohrer J. "Memory-Efficient Distribution of Regular Expressions for Fast Deep Packet Inspection", ISSS'09, Oct. 11-16, 2009, Grenoble, France, pp. 147-154.*

Mony H. et al., "Speculative Reduction-Based Scalable Redundancy Identification", Date '09, 2009.*

\* cited by examiner

VERIFYING CORRECTNESS OF REGULAR EXPRESSION TRANSFORMATIONS THAT USE A POST-PROCESSOR

BACKGROUND

This disclosure relates generally to the field of verifying the equivalence of a regular expression to a transformation of the regular expression that takes advantage of a post-processor to optimize the storage efficiency, and more particularly to determining the equivalence of a finite state automaton representation of a regular expression to a transformed finite state automaton representation of the regular expression that is coupled with a pre-verified and pre-optimized post-processor.

Figure 1:
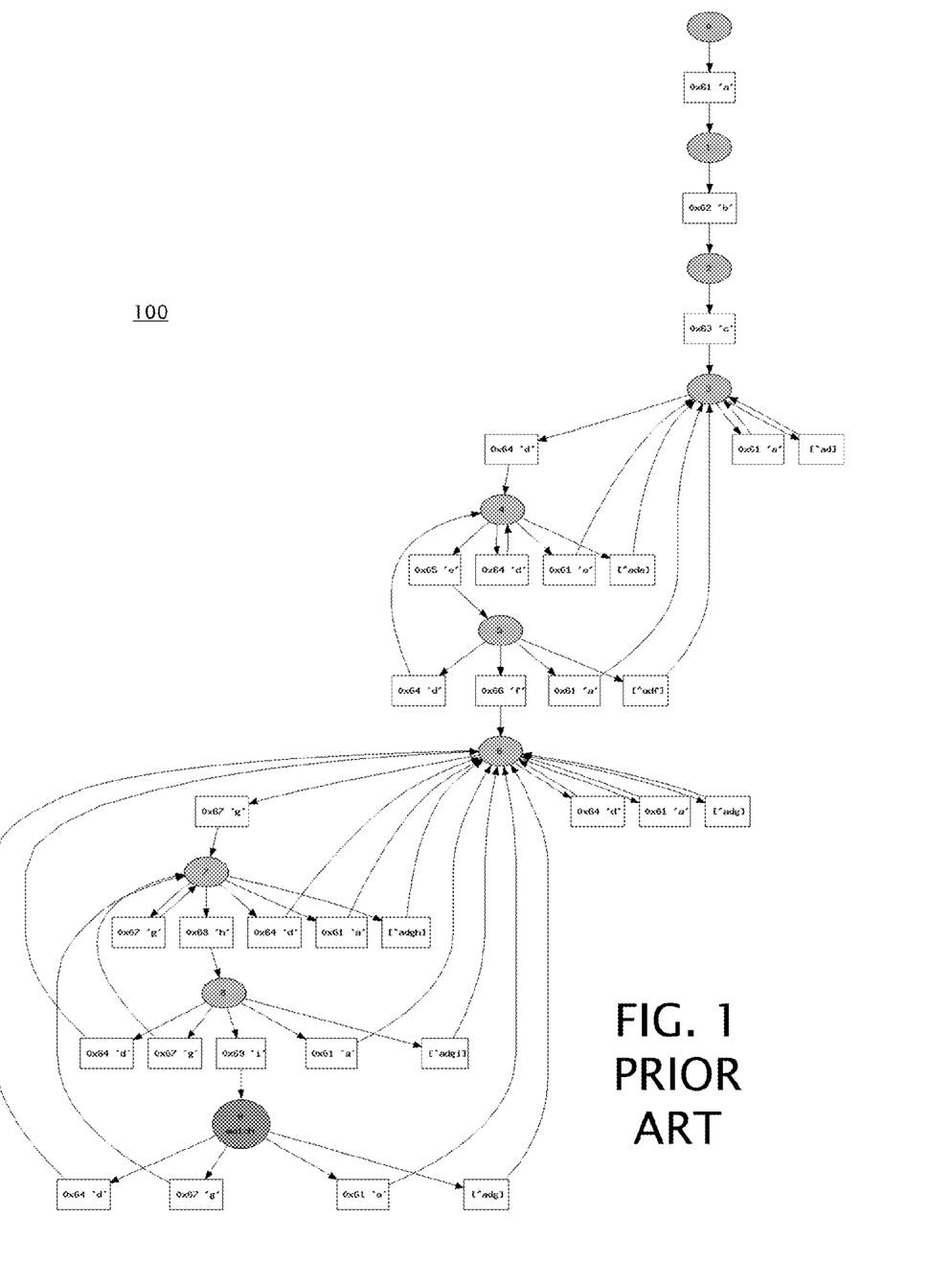
FIG. 1 illustrates an example of a DFA.

Packet content scanning is an essential part of network security and monitoring applications. Intrusion detection systems such as Snort™ rely heavily on regular expressions to express increasingly complex attack patterns. A typical way of matching regular expressions in a stream of input characters is by simulating the input on a Finite State Automaton (FSA), which may be a nondeterministic FSA (NFA) or a deterministic FSA (DFA), compiled from the regular expression. For example, FIG. 1 shows an example of a DFA 100 that detects the regular expression "abc.*def*ghi" in an input data stream. The regular expression "abc.*def*ghi" is in perl compatible regular expression (PCRE) format. The DFA 100 is modeled as a directed graph. The DFA states are shown in circles, the state transitions are shown using directed edges, and the set of input characters resulting in the transitions (i.e., the transition rules) are given in the rectangular boxes. The initial state of the DFA is labeled as state 0, with intermediate states numbered 1 to 8, leading up to a match of the regular expression at state number 9. The plurality of transition rules governs transitions between the states. Note that if the regular expression is non-anchored, additional transitions that point to state 0 and state 1 would be needed in FIG. 1. Similarly, if the regular expression is anchored, there has to be an explicit invalid state in the DFA and additional transitions pointing to the invalid state for state/input combinations without a valid next state.

A FSA architecture may be programmed to recognize one or more regular expressions in an input data stream by loading a set of state transition rules into off-chip or on-chip memories. Performance of such architectures depends on the storage efficiency of the compiled set of state transition rules, as on-chip memory resources are usually limited, and off-chip memory accesses can be costly in terms of processing time.

BRIEF SUMMARY

In one aspect, a method for determining correctness of a transformation between a first finite state automaton (FSA) and a second FSA, wherein the first FSA comprises a representation of a regular expression, and the second FSA comprises a transformation of the first FSA includes determining a third FSA, the third FSA comprising a cross product of the second FSA and a post-processor; determining whether the first FSA and the third FSA are equivalent; and in the event that the first FSA is determined not to be equivalent to the third FSA, determining that the transformation between the first FSA and the second FSA is not correct.

In another aspect, a computer program product comprising a non-transitory computer readable storage medium containing computer code that, when executed by a computer, implements a method for determining correctness of a transformation between a first finite state automaton (FSA) and a second FSA, wherein the first FSA comprises a representation of a regular expression, and the second FSA comprises a transformation of the first FSA, wherein the method includes determining a third FSA, the third FSA comprising a cross product of the second FSA and a post-processor; determining whether the first FSA and the third FSA are equivalent; and in the event that the first FSA is determined not to be equivalent to the third FSA, determining that the transformation between the first FSA and the second FSA is not correct.

In yet another aspect, A system for determining correctness of a transformation between a first finite state automaton (FSA) and a second FSA, wherein the first FSA comprises a representation of a regular expression, and the second FSA comprises a transformation of the first FSA, includes a computer configured to determine a third FSA, the third FSA comprising a cross product of the second FSA and a post-processor; determine whether the first FSA and the third FSA are equivalent; and in the event that the first FSA is determined not to be equivalent to the third FSA, determine that the transformation between the first FSA and the second FSA is not correct.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for determining equivalence of a FSA and a transformation of the FSA are provided, with exemplary embodiments being discussed below in detail. A transformation of a FSA, which may include a pre-verified and pre-optimized post-processor that contains local memory elements and a plurality of parallel FSA engines, can significantly reduce the size of the memory necessary to hold the transition rules of the transformed FSA, reducing time-consuming calls to off-chip memory. However, it is necessary to evaluate the output equivalence of a transformed FSA to its original FSA. Verifying that a transformation applied to a FSA preserves the meaning of the regular expression on which the original FSA is based is a challenging task, and automated methodologies for verifying the correctness of such transformations involving post-processor instructions are needed.

Figure 2:
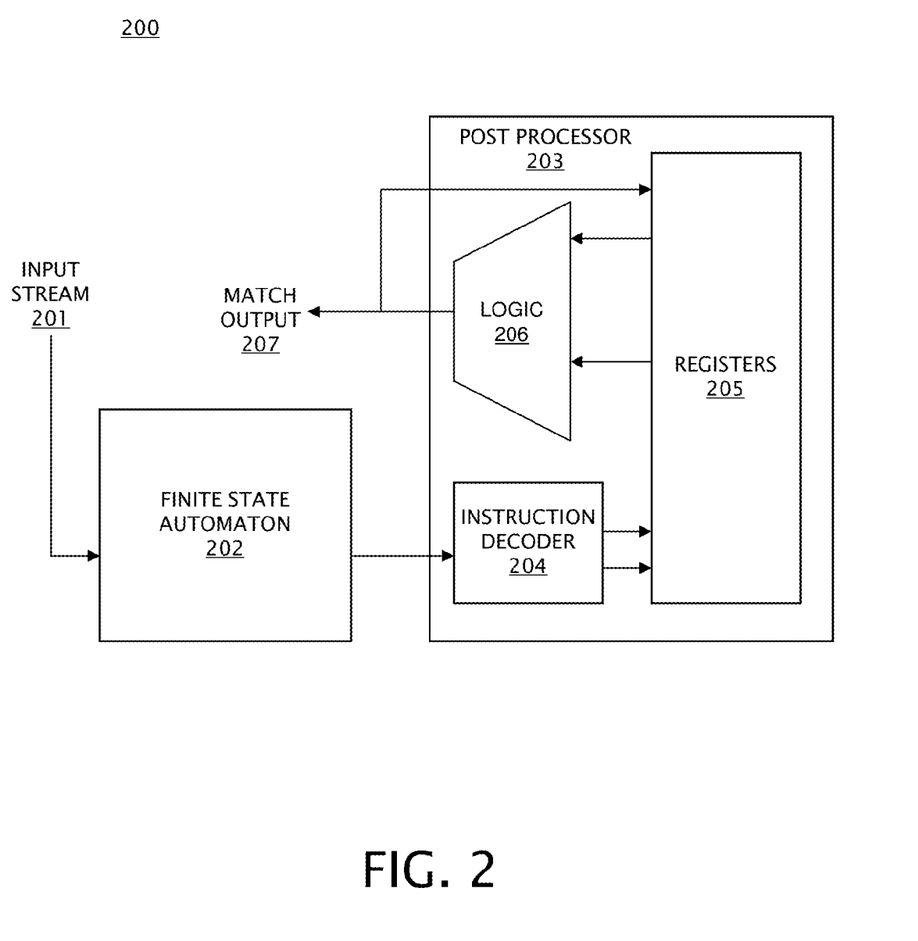
FIG. 2 illustrates an example of a FSA with a post-processor.

A technique that is known to be effective in compressing the transition rule space of a FSA is the decomposition of a complex regular expression into a sequence of simpler regular expressions that communicate through bitwise instructions and counters in a post-processor that contains local storage. The resulting architecture is referred to as a finite state machine with datapath (FSMD). FIG. 2 illustrates a FSMD 200 that combines a FSA 202 with a post-processor 203 that includes an instruction decoder 204, registers 205, combinational logic 206, and registers 205. An input data stream 201 is received by the FSA 202, and a match is indicated at output 207.

Figure 3:
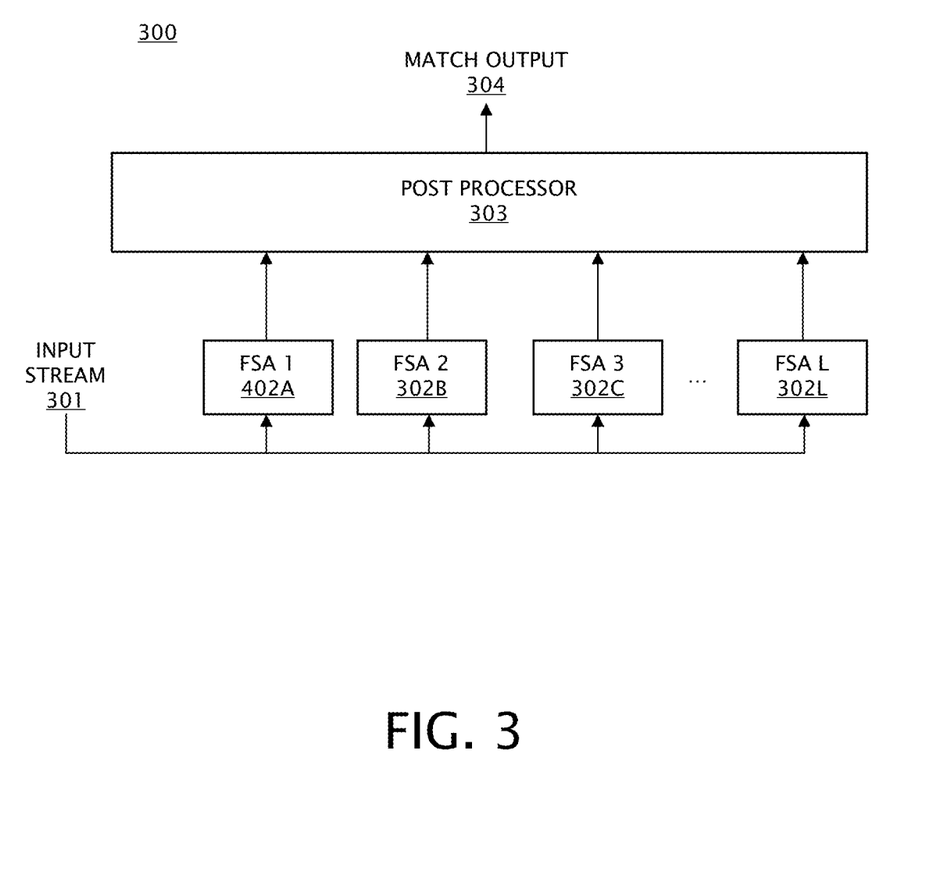
FIG. 3 illustrates an example of a plurality of parallel FSAs with a post-processor.

To further optimize the memory usage in the presence of a complex regular expression, multiple parallel FSA engines may be used in conjunction with a common post-processor. FIG. 3 shows an example of a FSMD 300 including a plurality of parallel FSA engines 302A-L. The data stream at input 301 is input to each of the parallel FSA engines 302A-L, and the post-processor 303 (which includes a set of internal components as shown with respect to post-processor 203 of FIG. 2) indicates whether the regular expression is matched at output 304. A FSMD may include any appropriate number of parallel FSAs.

Figure 4:
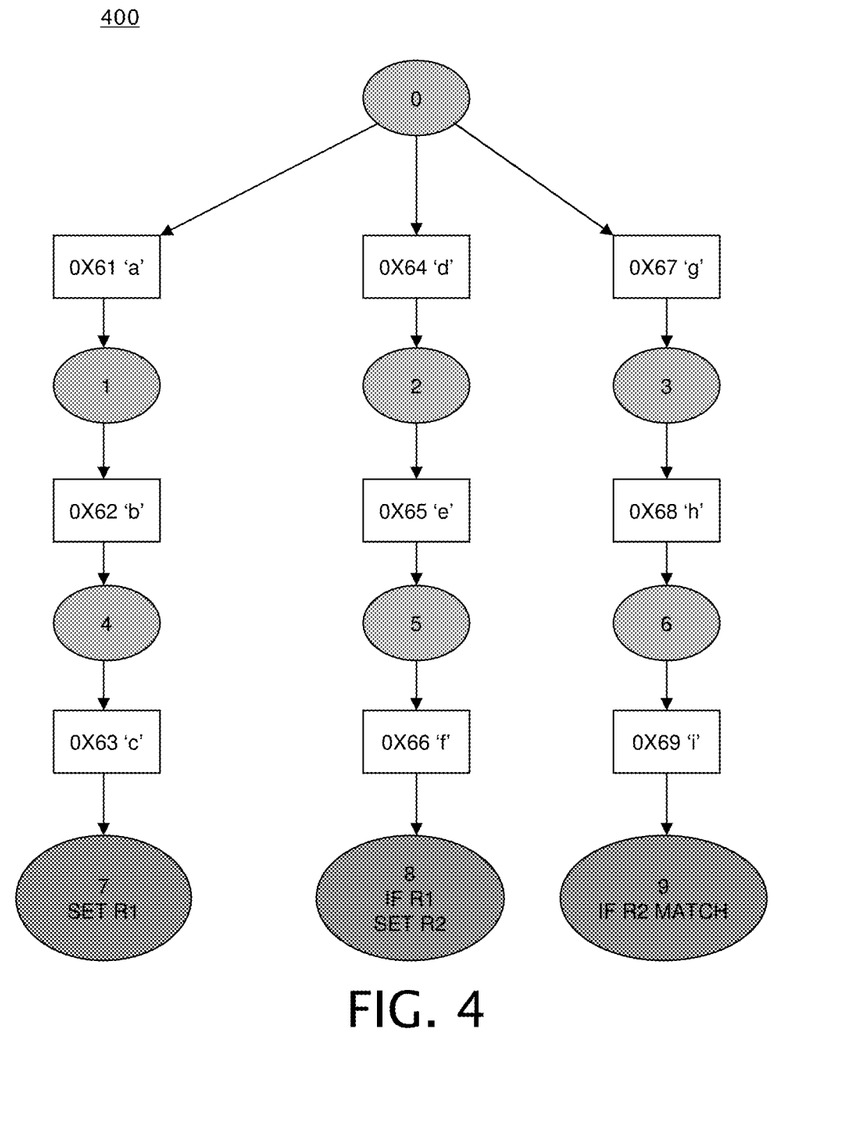
FIG. 4 illustrates an example of a DFA that is a transformation of the DFA of FIG. 1.

FIG. 4 shows an example of a DFA 400 expressed as a FSMD that is a transformation of the DFA 100 that was shown in FIG. 1. DFA 400 also detects the regular expression "abc.*def*ghi". If the original regular expression is non-anchored, it may be split into independent subexpressions "abc", "def", and "ghi", allowing the transformed DFA 400 to match each of the subexpressions independently. Starting at state 0 (zero), the leftmost column of states and transition rules detects the presence of "abc" in the input stream by proceeding through states 1 and 4 to state 7. At state 7, a register R1 is set indicating that "abc" was matched. Then, proceeding through states 2 and 5 to state 8 detects a match of "def". In state 8, R1 is tested, and if R1 is set, then R2 is set indicating the presence of "abc.*def". Lastly, proceeding through states 3 and 6 to state 9 detects a match of "ghi", and, in state 9, R2 is tested. If R2 is set, then a match of the whole regular expression "abc.*def*ghi" is indicated. The transformed DFA 400 may be implemented in three parallel DFAs with a post-processor. R1 and R2 may be 1-bit registers located in the post-processor. The transformed DFA of FIG. 4 includes a significantly smaller number of state transitions as compared to the initial DFA 100 of FIG. 1 while implementing the same functionality, reducing the amount of memory needed to store the DFA 400.

However, a transformation of a DFA that matches the regular expression "abc.*cde" may be problematic. A transformed DFA may match the subexpressions "abc" and "cde" independently. However, setting a register R whenever "abc" matches and then reporting a match whenever "cde" matches only if the register R is set does not preserve the meaning of the regular expression "abc.*cde". Such an approach would result in a match for an input string "abcde", which does not belong to the language defined by the regular expression "abc.*cde". A DFA transformation that does match "abc.*cde" may be achieved by applying further transformations to the DFA that make use of more complex instructions. For a general case, with a reference DFA $M^i$ and a transformed DFA $M^{i+1}$, it is necessary to determine whether $M^i$ and $M^{i+1}$ are output equivalent, i.e., for any possible sequence of inputs, the same sequence of outputs are produced by the two DFAs $M^i$ and $M^{i+1}$.

Figure 5:
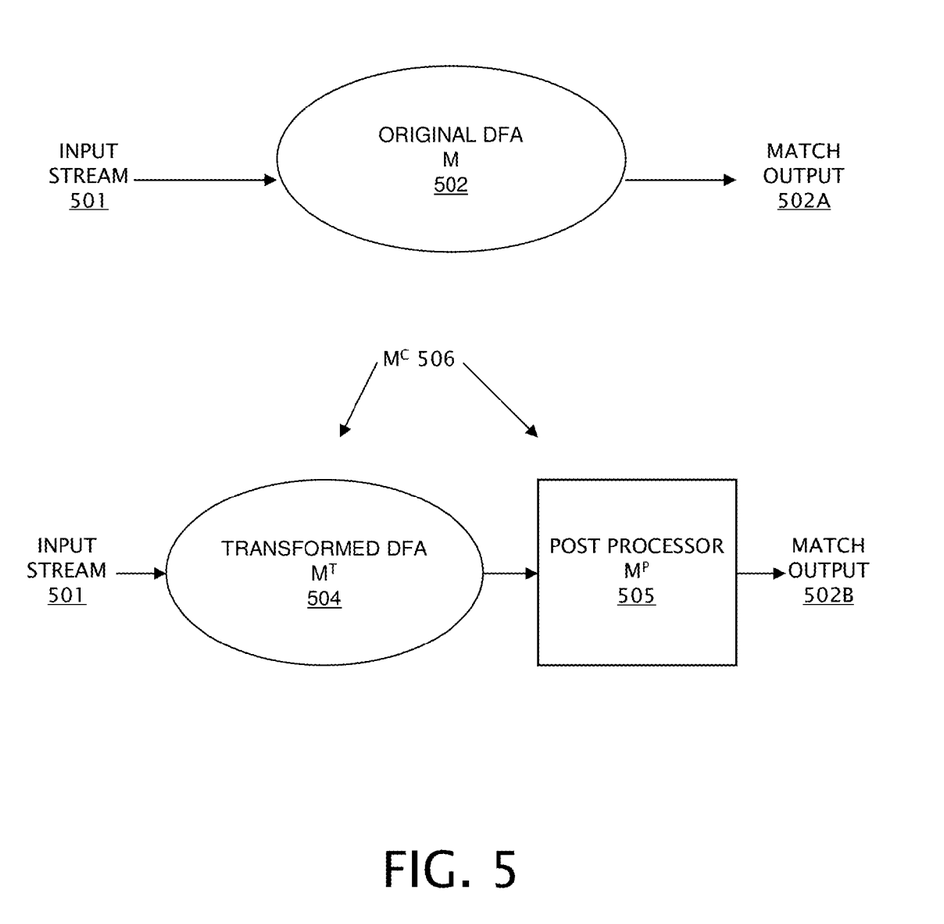
FIG. 5 illustrates an example of an original DFA and a transformed DFA.

Referring to FIG. 5, an embodiment of a reference DFA M (502), and a transformed DFA $M^T$ (504) with a post-processor $M^P$ (505) are shown. In other embodiments, DFA M (502) and transformed DFA $M^T$ (504) may comprise an NFA and a transformed NFA. $M^C$ (506) represents the FSMD that combines the transformed DFA $M^T$ (504) and the post-processor $M^P$ (505) as shown in FIG. 5. $M^C$ (506) is equal to the cross product of $M^T$ (504) and $M^P$ (505). The post-processor 505 includes an instruction decoder, registers, and combinational logic as are shown in FIG. 2 with respect to post-processor 203. The post-processor 505 may be predetermined, i.e., the transformation must take in to account the logic and memory capabilities of the post-processor 505. It must be determined whether M (502) and $M^C$ (506) are output equivalent, i.e., that for any possible sequence of inputs 501, the same sequence of outputs are given at the outputs 502A and 502B. The input 501 may be an 8-bit character per clock cycle. If the reference DFA M (502) implements a single regular expression only, a 1-bit input 501 is sufficient; one or both of outputs 502A-B are equal to '1' if there is a regular expression match in the current clock cycle, and are equal to zero otherwise. The notation introduced in Tables 1-5 below may be generalized to multiple regular expressions by increasing the size of the output set, e.g., using one output-bit per regular expression. Similarly, the input-length may be increased to support DFAs that can process multiple characters per clock cycle. The reference DFA M (502) may be a Moore machine or a Mealy machine in various embodiments. Below in Table 1 is a definition of a Mealy machine for the reference DFA M=(S; I; O; $s_0$; δ; λ):

TABLE 1

S is a finite non-empty set of states
I ∈ {0, 1}$^N$ is the set of inputs (N is the length of the input in bits)
0 ∈ {0, 1}$^K$ is the set of outputs (K is the length of the output in bits)
$s_0$ ∈ S is the initial state
δ: S X I → S is the transition function
λ: S X I → O is the output function The transformed DFA $M^T$ (504) can be a Moore machine of a Mealy machine in various embodiments. Below in Table 2 is a definition of a Mealy machine for the transformed DFA $M^T$=($S^T$; I; P; $s^T_0$; $δ^T$; $λ^T$):

TABLE 3

R is a finite non-empty set of states
P is a finite non-empty set of instructions supported by the post-processor (505)
O ∈ {0, 1}$^K$ is the set of outputs (K is the length of the output in bits)
$r_0$ ∈ R is the initial state of R
$δ^R$: R X P → R is the transition function
$λ^R$: R X P → O is the output function The post-processor (505) can also be modeled as a Moore machine or a Mealy machine. Below in Table 3 is a definition of a Mealy machine for the post-processor $M^P$=(R; P; O; $r_0$; $δ^R$; $λ^R$):

TABLE 2

$S^T$ is a finite non-empty set of states
I ∈ {0, 1}$^N$ is the set of inputs (N is the length of the input in bits)
P is a finite non-empty set of instructions supported by the post-processor (505) if a post processor is used, otherwise P is equal to the output TABLE 2-continued set $O \in \{0, 1\}^K$
$s^T_0 \in S^T$ is the initial state of $S^T$
$\delta^T: S^T \times I \rightarrow S^T$ is the transition function
$\lambda^T: S^T \times I \rightarrow P$ is the output function The combined architecture $M^C$ (506) containing the transformed DFA $M^T$ (504) and the post-processor $M^P$ (505) is a cross product of $M^T$ and $M^P$. Below in Table 4 is a definition of a Mealy machine for the combined architecture $M^C = ((S^T, R); I; O; (s^T_0, r_0); (\delta^T, \delta^R); \lambda^R)$:

TABLE 4

$S^T$ is a finite non-empty set of states
R is a finite non-empty set of states
$I \in \{0, 1\}^N$ is the set of inputs (N is the length of the input in bits)
$O \in \{0, 1\}^K$ is the set of outputs (K is the length of the output in bits)
$s^T_0 \in S^T$ is the initial state of $S^T$
$r_0 \in R$ is the initial state of R
$\delta^T: S^T \times I \rightarrow S^T$ is the transition function of $S^T$
$\delta^R: R \times S^T \times I \rightarrow R$ is the transition function of R
$\lambda^R: R \times S^T \times I \rightarrow O$ is the output function The architecture shown in FIG. 5 models R using the physical registers located in the post-processor 505. The transition function $\delta^R$ is implemented using post-processor instructions P that are input to the post-processor from the DFA engine to modify the contents of the post-processor registers. The combinational logic located in the post-processor acts as the state transition logic inside the post-processor and is activated by the received instructions P. The instructions in P may be modeled as a function of $S^T$ and I. Similarly, the output O of $M^C$ can be formulated as a function of R and P.

An additional way of optimizing the state space in the presence of multiple regular expressions is the use of multiple parallel FSA engines for $M^T$ in conjunction with the post-processor function $M^P$ (such as is shown in FIG. 3). To take advantage of the optimizations related to the use of parallel FSA engines and the optimizations related to the use of a post-processor at the same time, an architecture that supports parallel FSA engines interfaced to a common post-processor is needed. Assuming that the architecture supports up to L parallel DFAs sharing a post-processor, the automaton that combines the parallel DFAs with the post-processor can be formulated as a Mealy machine $M^C = ((S^1, S^2 \ldots S^L, R); I; O; (s^1_0, s^2_0 \ldots s^L_0, r_0); (\delta^1, \delta^2, \ldots \delta^L, \delta^R); \lambda^T)$ where $S^i$ represents states of parallel DFA engine i, $s^i_0$ represents the initial state of parallel DFA engine i, and $\delta^i$ represents the transition function of the parallel DFA engine i, shown below in Table 5:

TABLE 5

Figure 6:
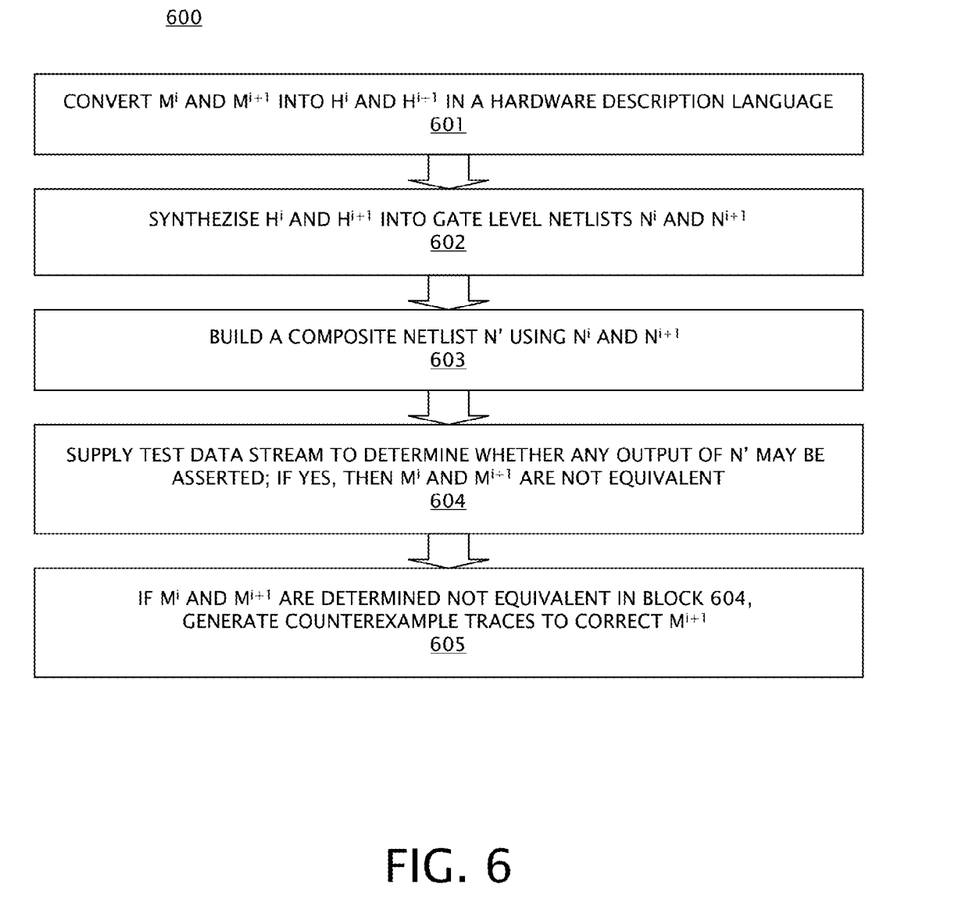
FIG. 6 illustrates an embodiment of a method of determining equivalence of a FSA and a transformation of the FSA.
Figure 7:
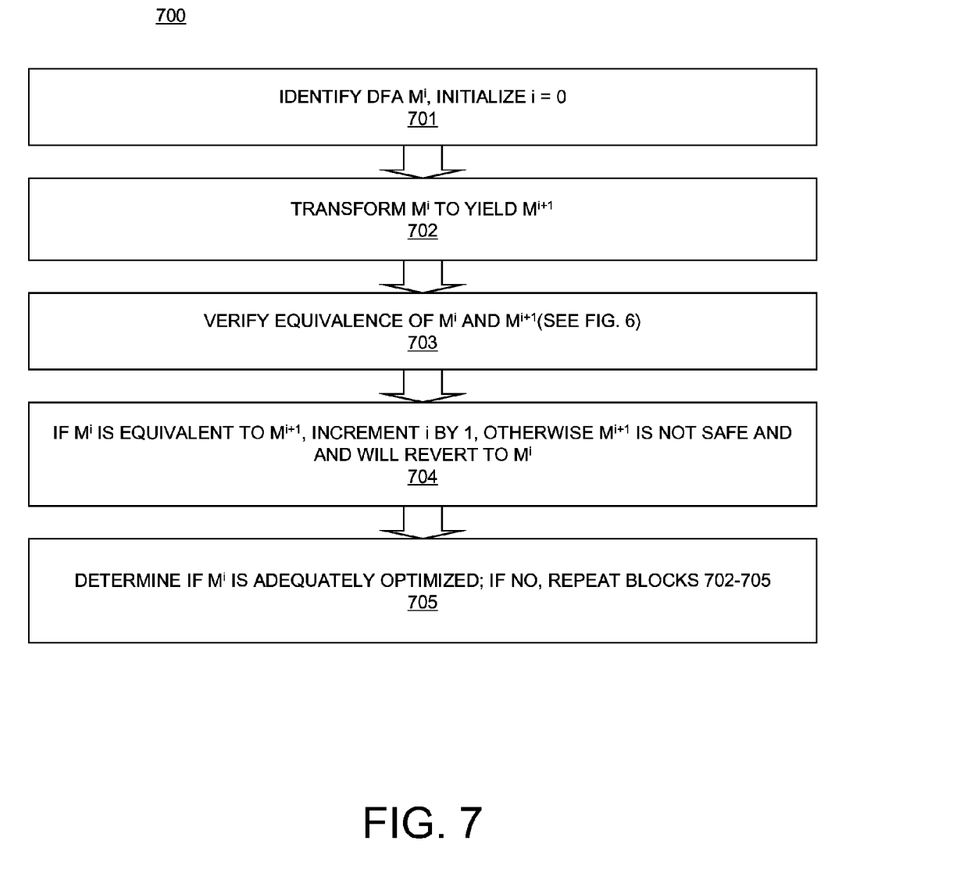
FIG. 7 illustrates an embodiment of a method of optimizing a FSA through successive transformations.

$S^i$ is a finite non-empty set of states
R is a finite non-empty set of states
$I \in \{0, 1\}^N$ is the set of inputs (N is the length of the input in bits)
$O \in \{0, 1\}^K$ is the set of outputs (K is the length of the output in bits)
$s^i_o \in S^i$ is the initial state of $S^i$, $i \in \{1, 2, \ldots, L\}$
$r_o \in R$ is the initial state of R
$\delta^i: S^i \times I \rightarrow S^i$ is the transition function of $S^i$, $i \in \{1, 2, \ldots, L\}$
$\delta^R: R \times S^1 \times \ldots \times S^L \times I \rightarrow R$ is the transition function of R
$\lambda^T: R \times S^1 \times \ldots \times S^L \times I \rightarrow O$ is the output function FIG. 6 illustrates a flowchart of an embodiment of a method 600 of determining equivalence of a FSA and a transformation of the FSA. Method 600 may be used to determine whether a FSA $M^i$ and an associated transformed FSA $M^{i+1}$ are equivalent as part of a sequence of FSA transformations as described above with respect to method 700 of FIG. 7, i.e., in block 703, which is discussed below. Alternately, method 600 may be executed in a stand-alone equivalence verifying module for a FSA transformation. The transformed FSA $M^{i+1}$ may include one or more parallel FSA engines and a post-processor, such as was shown above with respect to FIG. 3. Referring to FIG. 5, $M^i$ may be equivalent to M, and $M^{i+1}$ may be equivalent to $M^C$, which is the cross product of $M^T$ and $M^P$. In block 601 of FIG. 6, two FSAs, $M^i$ and $M^{i+1}$, are received. The two FSAs $M^i$ and $M^{i+1}$ are each converted into hardware description language (HDL) code. The hardware description language code of $M^i$ is referred to as $H^i$, and the hardware description language code of $M^{i+1}$ is referred to as $H^{i+1}$. The hardware description language may be VHSIC HDL (VHDL) in some embodiments. A partial example of computer code for conversion of the DFA 400 of FIG. 4 into VHDL is shown below with respect to the code segment in Table 6. In block 602, $H^i$ and $H^{i+1}$ are synthesized into gate-level netlists $N^i$ and $N^{i+1}$. A netlist is a list of logic gates and interconnections that make up a circuit, and is generated from the HDL code. In block 603, a composite netlist N' that includes $N^i$ and $N^{i+1}$ is built. The composite netlist includes a common input to both $N^i$ and $N^{i+1}$, and an exclusive- or logic connected to the outputs of both $N^i$ and $N^{i+1}$. An embodiment of a composite netlist N' is shown in FIG. 7, and discussed in further detail below. In block 604, a test data stream is supplied at the input to the composite netlist N', and it is determined if any output of the composite netlist N' can be asserted (i.e., is a logical '1'). If any output of N' can be asserted, then $N^i$ and $N^{i+1}$ have differing outputs for the same test input, indicating that $M^i$ and $M^{i+1}$ are not output equivalent. In block 605, if $M^i$ and $M^{i+1}$ are determined not to be equivalent, counterexample traces may be generated from the portion of the test data stream that generated the asserted output of the composite netlist N'. These counterexample traces may be used to correct $M^{i+1}$ so that the corrected version of $M^{i+1}$ is equivalent to $M^i$.

For a FSA based on a complex regular expression, multiple transformations may be applied to the FSA in order to optimize the compiled transition rule space of the FSA. FIG. 7 illustrates a flowchart of an embodiment of a method 700 for optimizing a FSA. In block 701, a FSA $M^i$ is identified, and i is initialized to 0 (zero). In block 702, $M^i$ is transformed to produce $M^{i+1}$. This may be performed according to any appropriate FSA transformation method. $M^{i+1}$ may include one or more parallel FSA engines and a predetermined post-processor, such as was shown in FIG. 5. The transformation may take into account the predetermined post-processor architecture. In block 703, it is determined whether $M^i$ and $M^{i+1}$ are equivalent by performing the method 600 illustrated in FIG. 6, which was discussed above. In block 704, if $M^i$ and $M^{i+1}$ are not determined to be equivalent in block 703 then $M^{i+1}$ is not safe, and $M^{i+1}$ reverts to $M^i$. Otherwise, i is incremented by 1. In block 705, it is determined if $M^i$ is adequately optimized. This determination may be based on, for example, whether the sets of transition rules that make up $M^i$ fit in the on-chip memories available for parallel FSA engines in the FSMD architecture. If $M^i$ is not adequately optimized, flow returns to block 702, and blocks 702-705 are repeated until the FSA is adequately optimized.

Figure 8:
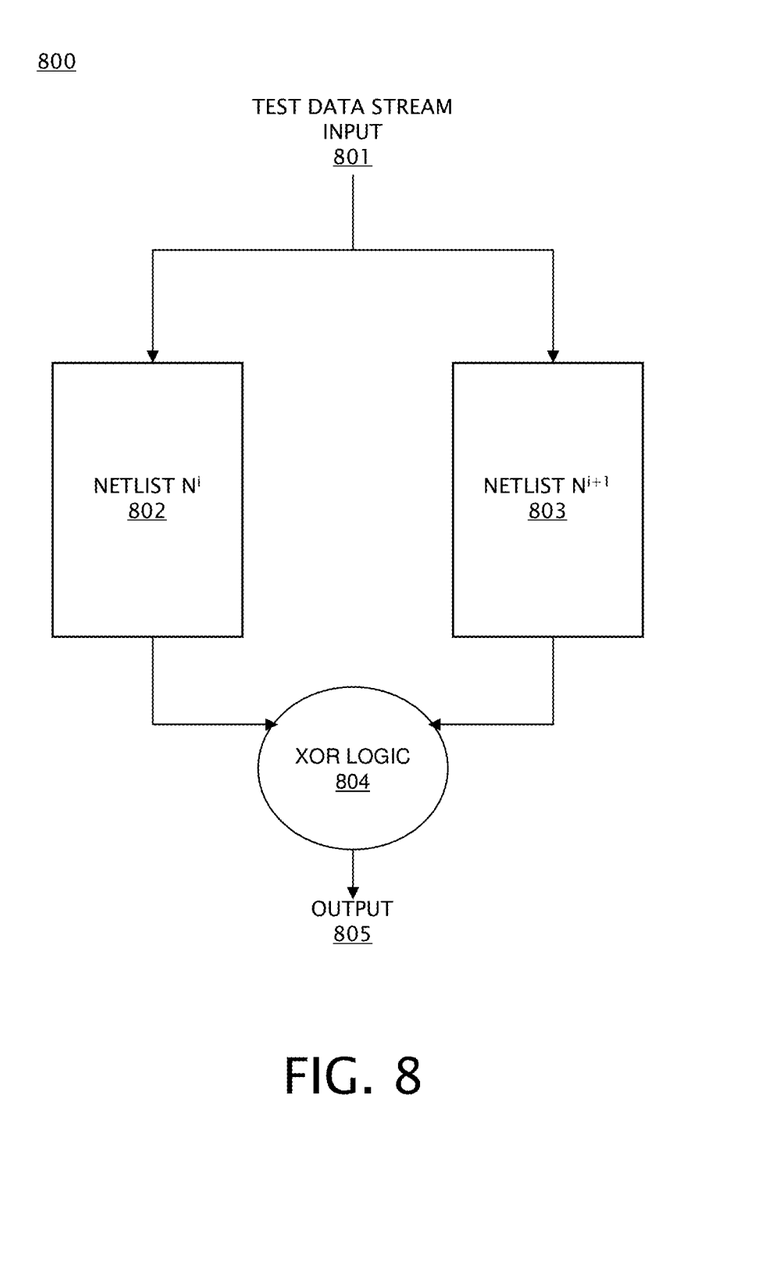
FIG. 8 illustrates an embodiment of a composite netlist built from a FSA and a transform of the FSA.

FIG. 8 shows an embodiment of a composite netlist N' 800 that is generated in block 603 of FIG. 6. A test data stream is received at input 801, and is processed by both netlist $N^i$ (802) and netlist $N^{i+1}$ (803). The outputs of both $N^i$ (802) and $N^{i+1}$ (803) are received by exclusive OR (XOR) logic 804. The output 805 of N' will only asserted to a logical '1' if the corresponding outputs of $N^i$ (802) and $N^{i+1}$ (803) are differing values. If the output 805 is asserted, $N^i$ (802) and $N^{i+1}$ (803), and therefore their underlying FSAs $M^i$ and $M^{i+1}$, are not equivalent. If every output 805 of N' (800) is proven as unassertable, $N^i$ (802) and $N^{i+1}$ (803), and hence $M^i$ and $M^{i+1}$, are determined to be equivalent. A sequential equivalence checking tool may be used to generate the test data stream received at input 801. For example, the Sixth Sense Software by International Business Machines (IBM) may be used to generate test data stream 801. Synthesizing the two FSAs $M^i$ and $M^{i+1}$ into a form that equivalence checking software such as Sixth Sense can handle, i.e., the composite netlist N' 800 as shown in FIG. 7, greatly simplifies FSA equivalence checking The initial state of composite netlist N' 800 is the cross-product of the initial states of $N^i$ (802) and $N^{i+1}$ (803). Counterexample traces, such as may be generated in block 605 of FIG. 6, may be obtained by determining a portion of the test data stream 801 that generates an asserted output 805 of N' (800).

The code segment below in Table 6 illustrates an example of a method of generating partial VHDL code of the DFA 400 of FIG. 4. The state transitions may be implemented using an encapsulating case statement and additional if statements nested inside the case statement. For brevity, only the VHDL code for states 4, 5, and 6 of DFA 400 of FIG. 4 are shown in the code segment below. Again for brevity, an explicit post-processor module is not instantiated in the code, and the post-processor instructions are implemented directly inside the "if" statements. Note that the overall state of the DFA 400 is defined by the contents of the registers CS, C_REG, and C_MATCH.

TABLE 6

```
1: entity transformed is
2: port (CLOCK, RESET : in STD_LOGIC;
3:     C_IN: in STD_LOGIC_VECTOR(8 downto 1);
4:     MATCH: out STD_LOGIC);
5: end transformed;
6:
7: architecture BEHAVIORAL of transformed is
8: type STATE_TYPE is (S0, S1, S2, S3, S4, S5, S6, S7, S8, S9);
9: signal CS, NS: STATE_TYPE;
10: signal C_REG, N_REG: STD_LOGIC_VECTOR(2 downto 1);
11: signal C_MATCH, N_MATCH: STD_LOGIC;
12: begin
13:     SYNC_PROC: process (CLOCK, RESET)
14:     begin
15:         if (RESET='1') then
16:             CS <= S0; C REG <= b"00"; C_MATCH <= '0';
17:         elsif (CLOCK'event and CLOCK = '1') then
18:             CS <= NS; C REG <= N REG; C_MATCH <=
                    N_MATCH;
19:         end if;
20:     end process; -End SYNC_PROC
21:     COMB PROC: process (CS, C IN)
22:     begin
23:         MATCH <= C_MATCH;
24:         case CS is
25:             when S1 => ...
26:             when S2 => ...
27:             when S3 => ...
28:             when S4 =>
29:                 if (C IN = x"63") then - Set first bit
30:                     N_REG <= C_REG or b"01"; NS <= S7;
                        N_MATCH <= '0';
31:                 else
32:                     N_REG <= C_REG; NS <= S0; N_MATCH <=
                        '0';
33:                 end if;
34:             when S5 =>
35:                 if (C_IN = x"66") then
36:                     if (C_REG(1) = '1') then - Test first bit
37:                         N_REG <= C_REG or b"10"; - Set second
                            bit
38:                     else
```

TABLE 6-continued

```
39:                         N_REG <= C_REG;
40:                     end if;
41:                     NS <= S8; N_MATCH <= '0';
42:                 else
43:                     N_REG <= C_REG; NS <= S0; N_MATCH
                        <= '0';
44:                 end if;
45:             when S6 =>
46:                 if (C_IN = x"69") then
47:                     if (C_REG(2) = '1') then - Test second bit
48:                         N_MATCH = '1'; - Match!
49:                     else
50:                         N_MATCH <= '0';
51:                     end if;
52:                     N_REG <= C_REG; NS <= S9;
53:                 else
54:                     N_REG <= C_REG; NS <= S0; N_MATCH <=
                        '0';
55:                 end if;
56:             when S7 => ...
57:             when S8 => ...
58:             when S9 => ...
59:         end case;
60:     end process; -End_COMB PROC
61: end architecture BEHAVIORAL
```

Figure 9:
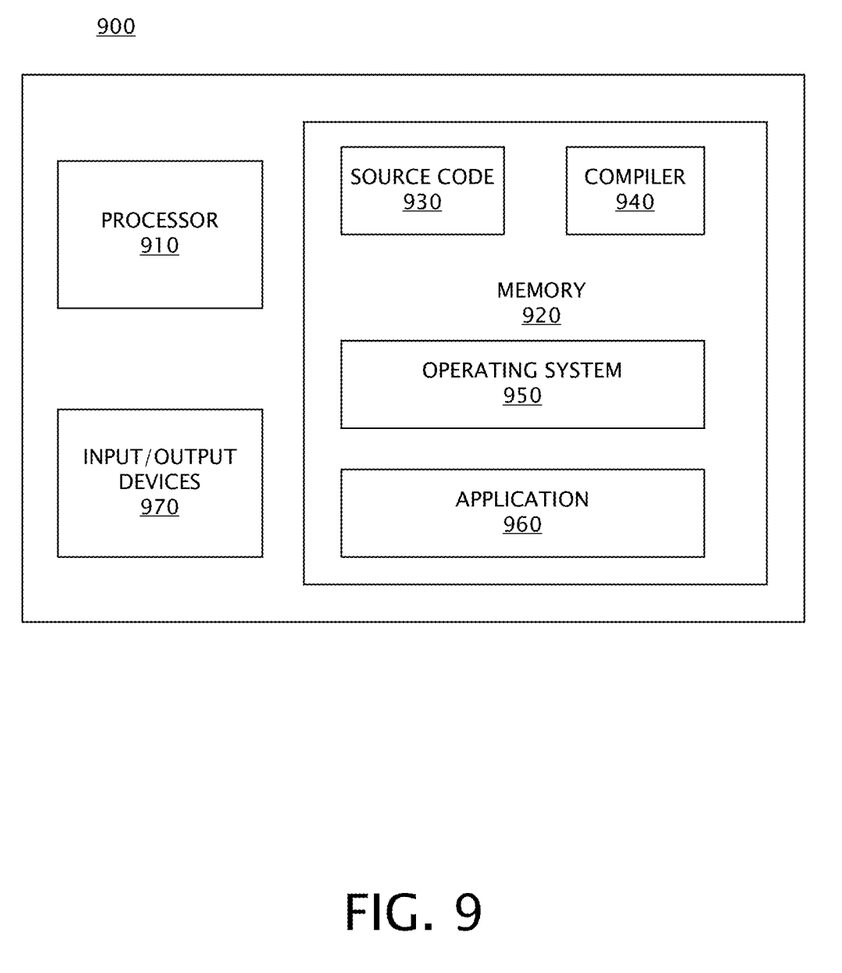
FIG. 9 is a schematic block diagram illustrating an embodiment of a computer that may be used in conjunction with a method for determining equivalence of a FSA and a transformation of the FSA.

FIG. 9 illustrates an example of a computer 900 which may be utilized by exemplary embodiments of a method for determining equivalence of a FSA and a transformation of the FSA as embodied in software. Various operations discussed above may utilize the capabilities of the computer 900. One or more of the capabilities of the computer 900 may be incorporated in any element, module, application, and/or component discussed herein.

The computer 900 includes, but is not limited to, PCs, workstations, laptops, PDAs, palm devices, servers, storages, and the like. Generally, in terms of hardware architecture, the computer 900 may include one or more processors 910, memory 920, and one or more input and/or output (I/O) devices 970 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 may be a semiconductor based microprocessor (in the form of a microchip) or a macroprocessor.

The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the memory 920 may include one or more separate programs, each of which comprises an ordered listing of executable instructions for implementing logical functions. The software in the memory 920 includes a suitable operating system (O/S) 950, compiler 940, source code 930, and one or more applications 960 in accordance with exemplary embodiments. As illustrated, the application 960 comprises numerous functional components for implementing the features and operations of the exemplary embodiments. The application 960 of the computer 900 may represent various applications, computational units, logic, functional units, processes, operations, virtual entities, and/or modules in accordance with exemplary embodiments, but the application 960 is not meant to be a limitation.

The operating system 950 controls the execution of other computer programs, and provides scheduling, input-output control, file and data management, memory management, and communication control and related services. It is contemplated by the inventors that the application 960 for implementing exemplary embodiments may be applicable on all commercially available operating systems.

Application 960 may be a source program, executable program (object code), script, or any other entity comprising a set of instructions to be performed. When a source program, then the program is usually translated via a compiler (such as the compiler 940), assembler, interpreter, or the like, which may or may not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 970 may include input devices such as, for example but not limited to, a mouse, keyboard, scanner, microphone, camera, etc. Furthermore, the I/O devices 970 may also include output devices, for example but not limited to a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 may further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 960 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 960 is implemented in hardware, the application 960 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include simplification of equivalence checking of two FSAs.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining correctness of a transformation between a first finite state automaton (FSA) and a second FSA, wherein the first FSA comprises a representation of a regular expression, and the second FSA comprises a transformation of the first FSA, comprises:
   determining a third FSA, the third FSA comprising a cross product of the second FSA and a post-processor;
   determining whether the first FSA and the third FSA are equivalent, wherein determining whether the first FSA and the third FSA are equivalent comprises:
      converting the first FSA into first hardware description language code;
      converting the third FSA into second hardware description language code;
      converting the first hardware description language code into a first netlist;
      converting the second hardware description language code into a second netlist;
      building a composite netlist, the composite netlist comprising the first netlist and the second netlist;
      receiving a test data stream at an input of the composite netlist; and
      in the event an output of the composite netlist is asserted, determining that the first FSA is not equivalent to the third FSA; and
   in the event that the first FSA is determined not to be equivalent to the third FSA, determining that the transformation between the first FSA and the second FSA is not correct.

2. The method of claim 1, wherein the composite netlist comprises:
   the input of the composite netlist, wherein the input of the composite netlist is connected to an input of the first netlist and to an input of the second netlist; and
   an exclusive or (XOR) logic, wherein an input of the XOR logic is connected to an output of the first netlist and to an output of the second netlist, and wherein the output of the composite netlist is an output of the XOR logic.

3. The method of claim 1, further comprising wherein in the event the output of the composite netlist is asserted, determining a portion of the test data stream that caused the assertion, and correcting the second FSA based on the determined portion of the test data stream.

4. A method for determining correctness of a transformation between a first finite state automaton (FSA) and a second FSA, wherein the first FSA comprises a representation of a regular expression, and the second FSA comprises a transformation of the first FSA, comprises:
   determining a third FSA, the third FSA comprising a cross product of the second FSA and a post-processor;
   determining whether the first FSA and the third FSA are equivalent;
   in the event that the first FSA is determined not to be equivalent to the third FSA, determining that the transformation between the first FSA and the second FSA is not correct; and
   in the event the transformation between the first FSA and the second FSA is determined to be correct, determining whether the second FSA is adequately optimized, and, in the event the second FSA is not adequately optimized:
      transforming the second FSA into a fourth FSA;
      determining a fifth FSA, the fifth FSA comprising a cross product of the fourth FSA and the post-processor;
      determining whether the second FSA and the fifth FSA are equivalent; and
      in the event that second FSA is determined not to be equivalent to the fifth FSA, determining that the transformation between the second FSA and the fourth FSA is not correct.

5. The method of claim 4, wherein the determination of whether the second FSA is adequately optimized is based on an amount of memory necessary to hold a set of transition rules comprising the second FSA.

6. A computer program product comprising a non-transitory computer readable storage medium containing computer code that, when executed by a computer, implements a method for determining correctness of a transformation between a first finite state automaton (FSA) and a second FSA, wherein the first FSA comprises a representation of a regular expression, and the second FSA comprises a transformation of the first FSA, wherein the method comprises:
   determining a third FSA, the third FSA comprising a cross product of the second FSA and a post-processor;
   determining whether the first FSA and the third FSA are equivalent, wherein determining whether the first FSA and the third FSA are equivalent comprises:
      converting the first FSA into first hardware description language code;
      converting the third FSA into second hardware description language code;
      converting the first hardware description language code into a first netlist;
      converting the second hardware description language code into a second netlist;
      building a composite netlist, the composite netlist comprising the first netlist and the second netlist;
      receiving a test data stream at an input of the composite netlist; and
      in the event an output of the composite netlist is asserted, determining that the first FSA is not equivalent to the third FSA; and
   in the event that the first FSA is determined not to be equivalent to the third FSA, determining that the transformation between the first FSA and the second FSA is not correct.

7. The computer program product according to claim 6, wherein the composite netlist comprises:
   the input of the composite netlist, wherein the input of the composite netlist is connected to an input of the first netlist and to an input of the second netlist; and
   an exclusive or (XOR) logic, wherein an input of the XOR logic is connected to an output of the first netlist and to an output of the second netlist, and wherein the output of the composite netlist is an output of the XOR logic.

8. The computer program product according to claim 6, further comprising wherein in the event the output of the composite netlist is asserted, determining a portion of the test data stream that caused the assertion, and correcting the second FSA based on the determined portion of the test data stream.

9. A computer program product comprising a non-transitory computer readable storage medium containing computer code that, when executed by a computer, implements a method for determining correctness of a transformation between a first finite state automaton (FSA) and a second FSA, wherein the first FSA comprises a representation of a regular expression, and the second FSA comprises a transformation of the first FSA, wherein the method comprises:
   determining a third FSA, the third FSA comprising a cross product of the second FSA and a post-processor;
   determining whether the first FSA and the third FSA are equivalent;
   in the event that the first FSA is determined not to be equivalent to the third FSA, determining that the transformation between the first FSA and the second FSA is not correct; and
   in the event the transformation between the first FSA and the second FSA is determined to be correct, determining whether the second FSA is adequately optimized, and, in the event the second FSA is not adequately optimized:
      transforming the second FSA into a fourth FSA;
      determining a fifth FSA, the fifth FSA comprising a cross product of the fourth FSA and the post-processor;
      determining whether the second FSA and the fifth FSA are equivalent; and
      in the event that second FSA is determined not to be equivalent to the fifth FSA, determining that the transformation between the second FSA and the fourth FSA is not correct.

10. The computer program product according to claim 9, wherein the determination of whether the second FSA is adequately optimized is based on an amount of memory necessary to hold a set of transition rules comprising the second FSA.

11. A system for determining correctness of a transformation between a first finite state automaton (FSA) and a second FSA, wherein the first FSA comprises a representation of a regular expression, and the second FSA comprises a transformation of the first FSA, comprising:
   a computer configured to:
      determine a third FSA, the third FSA comprising a cross product of the second FSA and a post-processor;
      determine whether the first FSA and the third FSA are equivalent, wherein verifying the equivalence between the first FSA and the third FSA by the computer comprises:
         converting the first FSA into first hardware description language code;
         converting the third FSA into second hardware description language code;
         converting the first hardware description language code into a first netlist;
         converting the second hardware description language code into a second netlist;
         building a composite netlist, the composite netlist comprising the first netlist and the second netlist;
         receiving a test data stream at an input of the composite netlist; and
         in the event an output of the composite netlist is asserted, determining that the first FSA is not equivalent to the third FSA; and
   in the event that the first FSA is determined not to be equivalent to the third FSA, determine that the transformation between the first FSA and the second FSA is not correct.

12. The system of claim 11, wherein the computer is further configured to, in the event the output of the composite netlist is asserted, determine a portion of the test data stream that caused the assertion, and correcting the second FSA based on the determined portion of the test data stream.

13. A system for determining correctness of a transformation between a first finite state automaton (FSA) and a second FSA, wherein the first FSA comprises a representation of a regular expression, and the second FSA comprises a transformation of the first FSA, comprising:
   a computer configured to:
      determine a third FSA, the third FSA comprising a cross product of the second FSA and a post-processor;
      determine whether the first FSA and the third FSA are equivalent;
      in the event that the first FSA is determined not to be equivalent to the third FSA, determine that the transformation between the first FSA and the second FSA is not correct; and
      in the event the transformation between the first FSA and the second FSA is determined to be correct, determine whether the second FSA is adequately optimized, and, in the event the second FSA is not adequately optimized:
         transform the second FSA into a fourth FSA;
         determine a fifth FSA, the fifth FSA comprising a cross product of the fourth FSA and the post-processor;
         determine whether the second FSA and the fifth FSA are equivalent; and
         in the event that second FSA is determined not to be equivalent to the fifth FSA, determine that the transformation between the second FSA and the fourth FSA is not correct.

14. The system of claim 13, wherein the determination of whether the second FSA is adequately optimized is based on an amount of memory necessary to hold a set of transition rules comprising the second FSA.

15. A method for determining correctness of a transformation between a first finite state automaton (FSA) and a second FSA, wherein the first FSA comprises a representation of a regular expression, and the second FSA comprises a transformation of the first FSA, comprises:
   determining a third FSA, the third FSA comprising a cross product of the second FSA and a post-processor, the second FSA comprising a plurality of parallel FSA engines, and the post-processor comprising an instruction decoder, a plurality of registers, and combinational logic configured to modify the contents of the plurality of registers based on input from the one or more parallel FSA engines;
   determining whether the first FSA and the third FSA are equivalent; and
   in the event that the first FSA is determined not to be equivalent to the third FSA, determining that the transformation between the first FSA and the second FSA is not correct.

16. A computer program product comprising a non-transitory computer readable storage medium containing computer code that, when executed by a computer, implements a method for determining correctness of a transformation between a first finite state automaton (FSA) and a second FSA, wherein the first FSA comprises a representation of a regular expression, and the second FSA comprises a transformation of the first FSA, wherein the method comprises:
   determining a third FSA, the third FSA comprising a cross product of the second FSA and a post-processor, the second FSA comprising a plurality of parallel FSA engines, and the post-processor comprising an instruction decoder, a plurality of registers, and combinational logic configured to modify the contents of the plurality of registers based on input from the one or more parallel FSA engines;

determining whether the first FSA and the third FSA are equivalent; and in the event that the first FSA is determined not to be equivalent to the third FSA, determining that the transformation between the first FSA and the second FSA is not correct.

17. A system for determining correctness of a transformation between a first finite state automaton (FSA) and a second FSA, wherein the first FSA comprises a representation of a regular expression, and the second FSA comprises a transformation of the first FSA, comprising:

a computer configured to:

determine a third FSA, the third FSA comprising a cross product of the second FSA and a post-processor, the second FSA comprising a plurality of parallel FSA engines, and the post-processor comprising an instruction decoder, a plurality of registers, and combinational logic configured to modify the contents of the plurality of registers based on input from the one or more parallel FSA engines;

determine whether the first FSA and the third FSA are equivalent; and in the event that the first FSA is determined not to be equivalent to the third FSA, determine that the transformation between the first FSA and the second FSA is not correct.

* * * * *